United States Patent
Damman et al.

[11] Patent Number: 5,940,301
[45] Date of Patent: Aug. 17, 1999

[54] PROCESS AND DEVICE FOR CONTROLLING A MACHINE TOOL IN PARTICULAR, AND EDM MACHINE

[75] Inventors: Matthias Damman, Giubiasco; Paolo Pestoni, Bellinzona; Luigi Stoira, Avengno; Fabrizio Robbiani, Bissone, all of Switzerland

[73] Assignee: AG fur industrielle Elektronik AGIE Losone bei Locarno, Switzerland

[21] Appl. No.: 08/843,644

[22] Filed: Apr. 10, 1997

[30] Foreign Application Priority Data

Apr. 10, 1996 [DE] Germany .......................... 196 14 128

[51] Int. Cl.⁶ .......................... G06F 19/00; G06G 7/64; G06G 7/66
[52] U.S. Cl. .................. 364/474.01; 364/474.02; 364/474.15; 364/474.16
[58] Field of Search .................. 364/474.01, 474.02, 364/474.04, 474.05, 474.07, 474.09, 474.2, 474.24, 474.22, 192, 191, 190, 193; 395/99; 318/560–569, 571, 572; 219/69.12, 69.14, 69.17

[56] References Cited

U.S. PATENT DOCUMENTS

| | | | |
|---|---|---|---|
| 4,410,938 | 10/1983 | Higashiyama | 364/200 |
| 4,468,741 | 8/1984 | Simonton | 364/474 |
| 4,703,143 | 10/1987 | Okubo et al. | 219/69 |
| 4,899,945 | 2/1990 | Jones | 242/45 |
| 4,939,334 | 7/1990 | Gruber et al. | 219/69.12 |
| 4,967,973 | 11/1990 | Murnane | 242/45 |
| 5,045,663 | 9/1991 | Neal et al. | 219/69.12 |
| 5,107,435 | 4/1992 | Yamada | 364/474.22 |
| 5,122,630 | 6/1992 | Reynier et al. | 219/69.12 |
| 5,248,104 | 9/1993 | Gross et al. | 242/45 |
| 5,266,876 | 11/1993 | Ito et al. | 318/568.24 |
| 5,266,878 | 11/1993 | Makino et al. | 318/571 |
| 5,315,503 | 5/1994 | Kato et al. | 364/192 |
| 5,410,117 | 4/1995 | Reynier et al. | 219/69.12 |
| 5,453,592 | 9/1995 | Takeuchi et al. | 219/69.17 |
| 5,465,215 | 11/1995 | Strickland et al. | 364/474.22 |

FOREIGN PATENT DOCUMENTS

| | | |
|---|---|---|
| 0 046 032 A1 | 7/1981 | European Pat. Off. . |
| 0 551 520 A1 | 7/1992 | European Pat. Off. . |
| 0 633 257 A2 | 1/1995 | European Pat. Off. . |
| 41 05 291 A1 | 2/1991 | Germany . |
| 41 05 291 C2 | 2/1991 | Germany . |
| 2 236 411 | 8/1990 | United Kingdom . |

*Primary Examiner*—William Grant
*Assistant Examiner*—Ramesh Patel
*Attorney, Agent, or Firm*—Gifford, Krass, Groh, Sprinkle, Anderson & Citkowski, P.C.

[57] ABSTRACT

The invention pertains to a method and a device for controlling a machine tool, in particular an EDM machine, wherein the control data necessary for machining one or more workpieces is fed from the control device to the machine tool. Therein a list of action data for controlling special procedures (actions) and a list of event data for characterizing prescribed operating states (events), in particular, malfunctions, are permanently provided. The action and event data are linked in setting up the machine such that upon occurrence of one or more events, one or more actions are performed.

9 Claims, 4 Drawing Sheets

PROCESS AND DEVICE FOR CONTROLLING A MACHINE TOOL IN PARTICULAR, AND EDM MACHINE

The invention pertains to a method and device for controlling a machine tool, in particular an EDM (Electrical Discharge Machining) machine, wherein the control data necessary for machining one or more workpieces is fed from the control device to the machine tool.

BACKGROUND

Such machine tools generally have a digital control unit, for instance, an NC (Numeric Control) or CNC (Computer Numeric Control) control unit. The control data required for numerical control, such as position and/or path and/or contour data for the desired machining of the workpiece, is fed to the control unit in the form of control inputs and there it is converted into control signals for the servo drive units of the machine tool.

As an example, an EDM machine, that is, an erosive die sinking or cutting machine, could be mentioned. Such EDM machines are used among other things for producing stamps and/or dies of conductive materials. A particularly economical rational use of such EDM machines is the production of molding forms for mass production. This results in the necessity in normal operation of the EDM machine of inputting individual control data, applicable only to the respective workpiece, before machining one or more workpieces. In addition to specifying the desired machining steps, it is also necessary here to take account of possible malfunctions or other exceptional situations during machining, such as a broken wire or a persistent electrical short circuit between the machining electrode and the workpiece of an EDM machine.

In preparing the EDM machine for a work process, that is, in so-called set-up, the machine operator must therefore provide special procedures for the case that such a malfunction occurs. Given the increasing complexity of workpiece machining on modern machine tools, such as three-dimensional erosion with an EDM machine, it is becoming more and more difficult for the machine operator to assess which special procedure or procedures are rational for the specific malfunction at a given point in the machining process. Setting up modern machine tools is therefore becoming more and more complex and elaborate.

Control methods of the type mentioned initially from prior art do not meet these requirements. They require control input in the form of finished "programs," known as control programs. Such a program comprises all control data and specifies, for instance, which cutting paths are to be performed, at what quality, at what point and in what sequence, on the workpiece to be machined. The control data is specified in a sequential series of commands to the control unit of the machine tools. Known control units for machine tools execute such control programs sequentially. The command corresponding to a certain machining step remains active here until a new machining step is specified by a new command in the next step of the command sequence of the control program. Special procedures for possible malfunctions are also provided in this command sequence. These also remain active until a new behavior of the machine tool, a new machining step perhaps, or another special procedure, is specified by a new command in a subsequent line of the command sequence.

The machine operator is left to his own imagination and experience in defining appropriate measures in any exceptional situations. It may be sufficient in die sinking with a simple geometry, for instance, to move away from the workpiece on the fastest possible route, but with a more complex geometry, the same command can lead to damaging the workpiece and/or the machining electrode. A subsequent correction of the control program when an unforeseen exceptional situation occurs also has the disadvantage that the work sequence must be interrupted, a new control program prepared and a new work sequence started.

The present invention aims to improve machine tools, particularly EDM machines, with respect to user-friendliness.

SUMMARY OF THE INVENTION

In the method for controlling machine tools, particularly EDM machines, according to the invention, the control unit has a list of event data to characterize predetermined operational states, particularly malfunctions occurring during the machining, referred to as "events" below, as well as a list of action data for controlling special procedures, referred to as "actions" below. The event and/or action data are each associated with a machining object and/or an operational mode of the machine tool and are linked with one another in setting up the machine tool such that upon the occurrence of one or more events, one or more actions are performed in predetermined sequence. A control unit according to the invention is provided for this purpose with one memory each for storing event and action data respectively, as well as with a user interface for linking event and action data in the manner above.

First of all, the control data according to the invention is stored in the control unit according to defined criteria and managed there. The criteria are, on the one hand, the association of the respective control data with a defined element of the machine tool such as tool table, workpiece pallet, individual workpiece, etc. In this manner the machine tool, or the controlling of the machine tool, is divided into so-called "machining objects," to each of which belong defined control data, events and actions in the present case. The control data is also sorted according to different operating modes of the machine tool, such as set-up mode, simulation mode, working mode, etc. The control method according to the invention now takes account of events which can happen to one or more machining objects during operation of the machine tool and links these with one or more actions to specify special procedures upon occurrence of the aforesaid event.

In contrast to known control methods, individual machining steps are no longer considered in isolation and strung together in a rigid command sequence, but are described as states of or measures applied to machining objects of the machine tool which are performed on machining objects. Consequently, the control device according to the invention manages all control inputs in consideration of individual machining objects of the machine tool, that is, in consideration of what effect a control input has on a given machining object.

The entire object structure of the machine tool is preferably based on a hierarchical order. Accordingly, the machining objects of the machine tool are managed by the control device hierarchically such that the control data belonging to a hierarchically higher machining object also applies to all subordinate machining objects. In other words, the control of the machine tool is subdivided into hierarchically stacked working levels, to each of which one or more machining objects of a given hierarchy stage belong. If, according to the invention, an event that can happen to a machining object of the machine tool is linked with one or more actions, then the control device according to the invention ensures that action (s) belonging to the one or more events of a hierarchically higher machining object also apply to all subordinate machining objects, insofar as no other action(s) is/are specified there for the same event. The control device according to the invention has an additional memory for storing a list of object data that characterizes the respective hierarchically managed machining objects of the machine tool.

For example, such a machining object pertains to an EDM machine as such, a special tool or a special machining step. The linkage of action and event specified for a special machining object applies generally to all machining steps pertaining to the special machining object. Accordingly, at the machine level, all those actions or events are specified that generally apply to the respective EDM machine and all machining steps carried out on it. For instance, in case of a wire breakage (event), the erosion wire should be rethreaded as a matter of course (action). Likewise, at the workpiece level, all those actions and events are specified which pertain to a special workpiece clamped onto the EDM machine. For instance, in case of a wire breakage (event), the work sequence should be interrupted and a new machining step started (action).

The hierarchical structure proposed here is extremely useful in guaranteeing a rapid and efficient set-up of an EDM machine on the one hand, and an equal management of the action and event data stored in the control device on the other. If a general special procedure is assigned to a hierarchically higher machining object, the machine level for instance, then this special procedure remains generally active for all machining steps running on the EDM machine. For a special individual machining step, that is, a hierarchically lower machining object, a different special procedure can be specified for the same event at any time. This is necessary, however, only if the special procedure for this special machining step is not intended to agree with the general special procedure on the hierarchically higher machining objects. In this way, the sequential control program corresponding to prior art for specifying the individual machining processes is broken up.

Since more or fewer machining objects are affected during machining at any point in time, if a defined event occurs during the machining process, the control unit according to the invention automatically goes back to the special procedure activated for the corresponding machining object.

The machining objects of an EDM machine preferably comprise the following elements: the EDM machine as such, a special tool table, a special pallet, a special group of workpieces (known as a lot) a special workpiece, a special machining process and, optionally, a special cutting path on the workpiece. These elements are ordered in the stated sequence and accordingly managed in the control unit. With increasing complexity of the workpiece geometry to be machined and the accompanying requirements for controlling the EDM machine, it is advantageous to subdivide the machining object pertaining to a special machining process into the following objects: a special machining group; a special machining process in a group; a special individual machining process; a special starting point and a special point on a path to be cut.

In order to guarantee an optimally wide spectrum of special procedures for possible exceptional situations action data is preferably provided for the following events: beginning and end of a work sequence; beginning and end of machining; interruption of machining; lack of a workpiece to be machined; disruption in starting; wire breakage; collision of the electrode guide; errors in threading a wire electrode or errors in the ISO (International Standard Organization) program.

According to the aforementioned, the invention provides the machine operator with a reliable aid, for instance, for setting up an EDM machine for possible exceptional situations. A memory in the control device according to the invention contains a list of all conceivable events that might occur during machining. These may be unexpected and undesired, such as genuine malfunctions. They may also be specified to the control unit in a defined manner by the appropriate programming. Such an event is, for instance, the programmed end of machining, which is indeed expected and desired. Furthermore, a number of action data are permanently stored in the control unit which controls certain already standardized actions of the EDM machine upon the occurrence of the corresponding events. One or more actions that may occur to a machining object of the EDM machine during operation from the entire action list may be assigned to a defined event from the event list. The event and/or action data here are sorted by machining object and/or operating mode of the machine tool and are displayed visually at least in part on a display unit in the user interface. This makes the procedures particularly easy for the machine operator to survey.

The lists of event, action and/or object data are preferably configured as so-called "open" lists. The machine operator can expand the predetermined action, event and object lists arbitrarily and thereby define individual behavior patterns for exceptional situations. This has the advantage that company know-how regarding favorable special procedures can be taken into account and the control unit can be permanently adapted to it.

Setting up an EDM machine is further simplified in that the control device preferably makes available automatically a selection of possible actions from the action list for each event from the event list. In this way, certain combinations of actions with events are ruled out from the beginning for reasons of process economy or safety technology.

In a preferred concrete embodiment of the control method a preliminary selection of events in the event list is made by specifying a certain machining object and/or a certain operating mode of the machine tool and displayed in a window of the display unit and by selecting one or more events from the object and/or operating-mode related event list a preliminary selection is made in the action list and displayed in an additional window of the display unit.

The control unit according to the invention thus automatically provides a selection of technically relevant events as well as a selection of event-related actions. This has the advantage that even inexperienced machine operators can set up a machine tool relatively simply for any possible special procedures.

With the aid of an input unit of the graphical user interface, one or more actions can be selected from the limited action list and linked to the previously selected event from the event list. Several actions can also be selected in succession from the action list and linked into a "new" action. Analogously, "new" events can also be specified by combining several events from the pre-existing event list. By simply selecting the sequence of the selected actions and visually displaying the selected actions on the display unit, it is possible for the machine operator to prepare an individual special procedure easily and to check and, if necessary, modify it at the display unit.

If needed, "new" machining objects of the machine tool can be specified analogously by the operator and the already existing object structure can thus be supplemented. In this way, a new type of individual machining or a group of individual machining operations can be incorporated into the object structure of the machine control unit and used for future machining in the manner of the invention.

In an advantageous variant of the invention, additional individualizing features for characterizing special operating parameters of an action, such as velocity, starting point, ending point and so on, are associated with the action data. In this way, the machine operator can define an action that he selects from the proposed action list more precisely and adapt it individually to special requirements.

BRIEF DESCRIPTION OF THE DRAWINGS

Preferred embodiments of the invention are described by way of example below on the basis of the appended drawings. These exhibit additional advantages of the invention. In the drawing

DETAILED DESCRIPTION OF THE PREFERRED EMBODIMENTS

The invention will be described below on the basis of an erosive cutting machine. This does not, however, imply any restriction of the invention, which has broad applicability in machine tool technology.

Such an erosive cutting machine ordinarily has a numerical control unit which controls the relative motion between workpiece and electrode determining the cut geometry which is necessary for machining the workpiece. An X/Y drive movable in the X/Y direction which is coupled to the workpiece table and receives the control signals from the control unit is provided for this purpose. The CNC control unit requires a control program containing control data, such as position data of one or more workpieces clamped onto the workpiece table, profile or contour data of the desired cut geometry, which it transforms into actuation signals for operating the X/Y drives. Additionally, the control program provides special procedures which are controlled automatically by the CNC control unit in case of the occurrence of certain exceptional situations.

Figure 1:
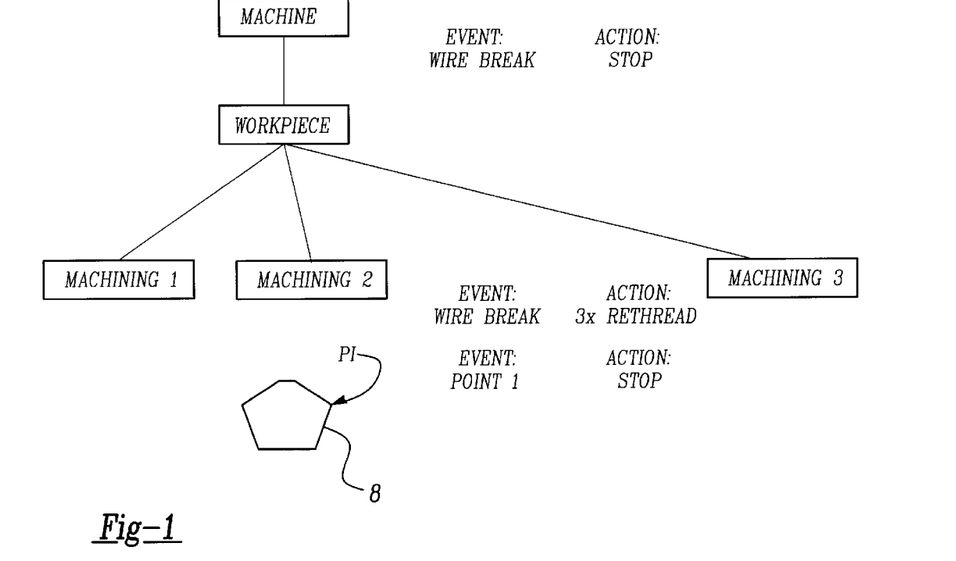
FIG. 1 shows a schematic illustration of a structure of special procedures corresponding to the method of the invention for various machining objects of an erosive cutting machine.

For the sake of example, FIG. 1 shows a selection of the special procedures which are permanently stored in a CNC control unit according to the invention and managed there by a suitable file management system. Actions or action data are associated for specifying particular special procedures after the appearance of one or more exceptional situations or events in the operation of the erosive cutting machine. The file management of the CNC control unit is subdivided according to FIG. 1 into different hierarchically stacked management levels—referred to below as working levels. Each working level of the CNC control unit comprises one or more elements for machining on the erosive cutting machine, referred to below as "machining objects." According to the invention, the actions belonging to a given machining object are linked to events belonging to the same machining object. This linkage of action to event applies in principle to all machining steps that are performed on the respective machining object.

In the control unit of FIG. 1, the hierarchically highest machining object is the "machine" object on the machine level to which actions and events are assigned which apply to all machining steps performed by the present erosive cutting machine. Similarly, for the lower machining objects; here a "workpiece" object on the workpiece level and several objects "operation 1," "operation 2," and "operation 3" on the machining level, actions and events are respectively assigned which apply only to the machining of a special workpiece or to special individual machining operations.

General special procedures, which are to apply in principle upon the occurrence of certain events during the entire operation, are specified for the hierarchically highest machining object, here the "machine" object. Such special procedures then also apply to the lower machining objects, unless a different special procedure upon the occurrence of the same event is specified for these machining objects. According to the invention, however, this is necessary only if a special procedure of an object on a lower working level is not intended to correspond to the general special procedure of the hierarchically higher machining object, known as the "mother object."

As an example of this, reference is made to the special procedures in FIG. 1. For the "machine" object, the action "stop," i.e., an interruption of machining, is specified for the event "wire breakage" in the present erosive cutting machine. Initially, this applies generally to the entire operation of the present erosive cutting machine—with the exception of the individual machining operation "operation 2" on the hierarchically lower machining level. For the "operation 2" machining object, a different action, namely "thread 3×" is specified for the same event. According to this object structure on which the control unit is based, therefore, machining is stopped on principle in the case of wire breakage, except when machining a special object of the object class "workpiece" according to a special machining step "operation 2," where machining is likewise interrupted and additionally the threading process is started.

It goes without saying that arbitrary special procedures can be selected for individual machining objects in case of individual events. As an example, the action "stop" upon reaching a defined point P on a cutting path 8 (event) in the machining object "operation 2" is cited here.

The control device according to the invention offers the machine operator a list of event data for characterizing the prescribed operating states (events). These may be unexpected and undesirable, like genuine malfunctions. They may also be specified by programming, as, for instance, the end according to plan of a machining step. The control unit also has available a list of action data for controlling special procedures (actions), as well as a list of object data for characterizing the aforesaid machining objects of the erosive cutting machine.

Figure 2:
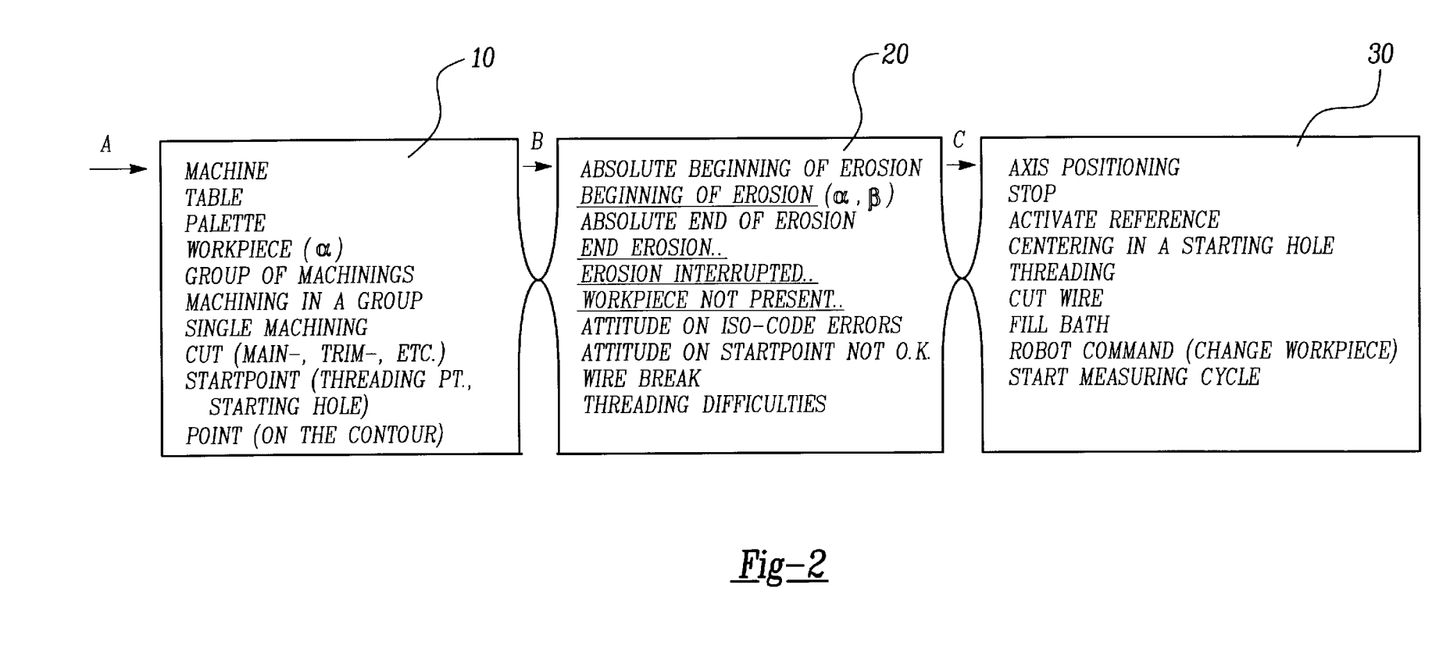
FIG. 2 shows a schematic illustration of a memory structure corresponding to the method of the invention for action, event and object data of erosive cutting machine.

An example of such an action, event and object list in the present erosive cutting machine is shown in FIG. 2. The data lists are permanently stored as shown in respective memories 10, 20 and 30 of the control device. The data lists are displayed in sections to the machine operator by means of a display unit in a user interface of the control device.

Figure 3:
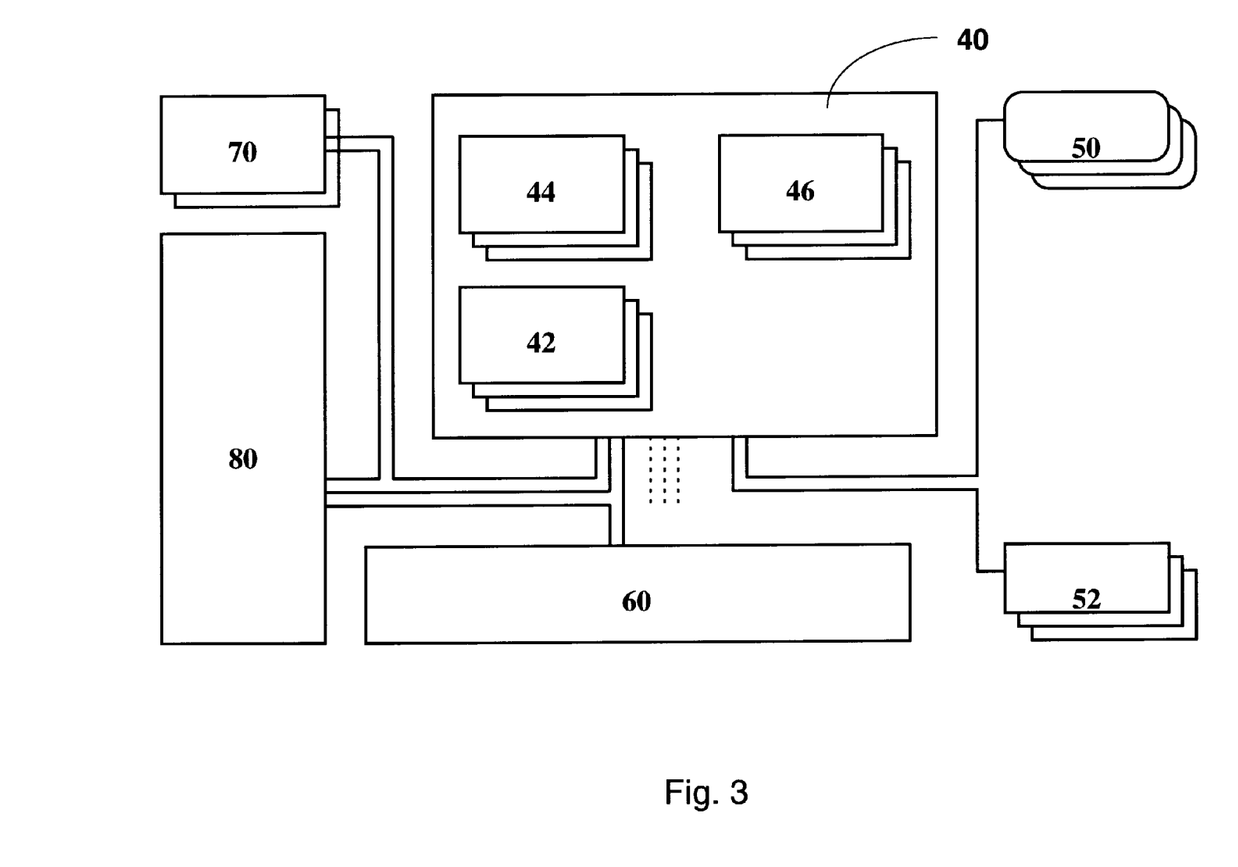
FIG. 3 shows the components of the control unit of the erosive cutting machine.

An example of a hardware implementation of the control unit according to the invention is shown in FIG. 3. A control device 40 has at its disposal several fixed memories 42 which are suited for permanent storage of the aforementioned data lists. Furthermore, several interim memories 44 as well as one or more computing units 46 are provided. The control unit 40 also has at its disposal a display unit 50 and an associated input unit 52 of a graphical user interface. In the case of the present erosive cutting machine, the control unit 40 is combined with a dielectric preparation unit 60, a pulse generator 70 and the machining apparatus 80.

The object list in the memory 10 in FIG. 2 comprises, citing only a part, the following working levels: machine level; level of the workpiece table, a pallet of a group of workpieces of a special workpiece to be machined, etc. The event list in memory 20 comprises, citing only a part, the events: absolute beginning and absolute end of an operating sequence, beginning and end of a special erosive process, unexpected cessation of the erosion, missing workpiece on the workpiece table, and so on. Finally, the memory 30 receives a list of actions: for instance, positioning the machine axes, machine stop, activating the reference system, and so on.

The events in memory 20 are each sorted by defined machining objects as well as a defined operating mode, such as setting up the machines, simulation run or erosion process. Each event from the event list is assigned a parameter pair $\alpha$, $\beta$ which characterize a defined machining object, here the machining object "machine," by $\alpha$, as well as a defined operating mode, here the operating mode "erosion," by $\beta$. Each action in the action list 30 is assigned to a defined event in the event list 20; that is, conversely, one or more actions in the memory 30 belong to an event in the memory 20. When setting up the erosive cutting machine, the machine operator selects a defined machining object, for instance, the object "workpiece." This is indicated in FIG. 2 by an arrow A. The machine operator also selects a defined operating mode in which the object "workpiece" is to be operated, in the present case, the operating mode "erosion." The control device then searches through the memory device 20 for events belonging to the object "machine" and the operating mode "erosion" and outputs these in a window of the display unit 50. By way of example, there are the events underlined in FIG. 2.

In this manner, the event list is limited to the relevant events with respect to the object and the operating mode. The machine operator now selects a particular event from this limited event list. This may be unexpected, for instance, the event "workpiece not present." The event may also occur in a prescribed manner, for instance, the event "beginning of erosion."

If the event "beginning of erosion" is selected from the memory 20, represented symbolically in FIG. 2 by an arrow B, then the control device 40 makes available a selection of technically meaningful actions from the memory 30 and displays these in an additional window of the display unit 50. From the event-related action list, the machine operator now selects the desired action, here the action "activate reference" labeled with arrow C, with the aid of the input unit 52 of the graphical interface. In this manner, the special procedure "activate reference" is retrieved from the memory 30 whenever the event "beginning of erosion" occurs for the machining object "workpiece."

In the same manner, the machine operator can link another event from the memory 20, for instance, an unexpected "wire breakage," with an action from the memory 30, for instance "stop," which is assigned to the machining object "machine" from the memory 10. Thereby the special procedure "stop machine in case of wire breakage" is specified in principal for all machining steps on the present erosive cutting machine.

For the action selected from the action list 30, finally, certain parameters can be specified individually. For this purpose, respective additional individualizing features which characterize the special action with respect to special operating parameters are assigned to the action data in memory 30. As an example, one could mention here the action "centering in a starting hole" which can be specified, for instance, with respect to starting position and moving velocity by the machine operator.

It goes without saying that it is also possible for several actions from the memory 30 to be assigned to an event from the memory 20 in a prescribed sequence, or for several events from the memory 20 to be linked together into a "new event" with the aid of the input unit 52 of the graphical user interface.

As an example for the preparation of special procedures for an erosive cutting machine based on the data lists specified by the control device 40, one could mention, for instance:

- on the machine level (object) the current machining step is interrupted in case of wire breakage (event) in erosion operation (operating mode) and the next machining step is started (sequence of two actions);
- at the start (event) of a special machining operation (machining object) in erosion operation (operating mode), the axes are positioned and a measuring cycle is started (sequence of two actions); and
- in case during erosion operation (operating mode) on a workpiece (object) no workpiece is clamped onto the workpiece table (event), the axes are positioned at prespecified values, a new workpiece is clamped in using a robot and a centering of the wire electrode is performed in a starting hole (sequence of three actions).

Figure 4:
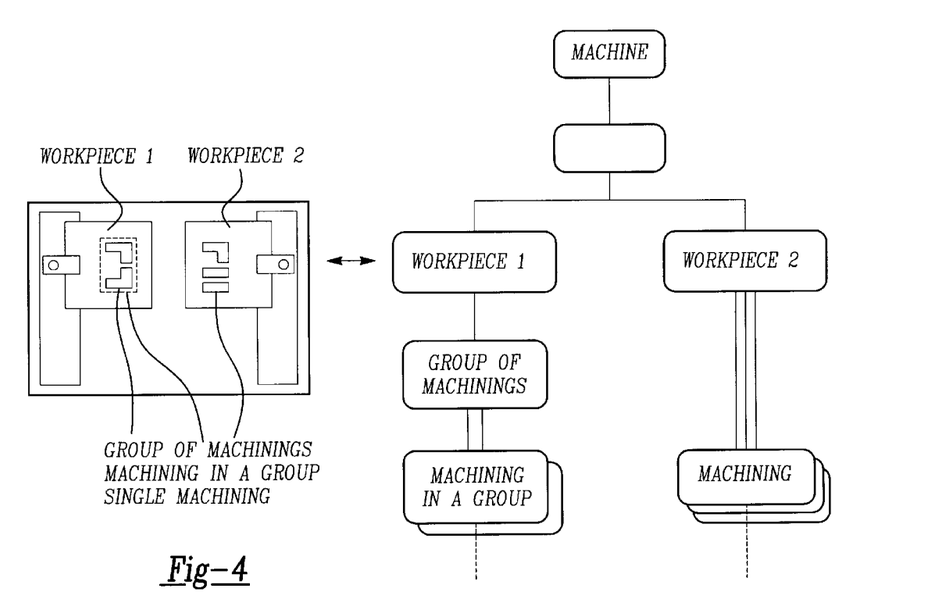
FIG. 4 shows a schematic illustration of an object structure of the erosive cutting machine.

As already discussed, the assignment of control data to defined machining objects of the erosive cutting machine as proposed here permits a rapid and efficient set-up of the machine. In order to illustrate the object structure of the invention, the left half of FIG. 4 shows a workpiece table of an erosive cutting machine with two workpieces, "workpiece 1" and "workpiece 2" clamped onto it. Machining steps, that is, cutting contours which are to be carried out by the erosive cutting machine, are drawn in for each workpiece. On workpiece 1 the individual machining operations form a cohesive machining group, while the individual machining operations on workpiece 2 are each to be conducted independently of the others.

The workpiece table of the erosive cutting machine illustrated with the individual machining elements is assigned the object structure of the control unit of the invention as illustrated in the right half of FIG. 4. The hierarchically highest machining object pertains to the machine as such. Lying beneath it are additional working levels only hinted at in FIG. 4, for instance, a special workpiece table, a pallet of workpieces and so on. On the workpiece level, a machining object "workpiece 1," to which all control data pertaining to the illustrated workpiece 1 belong, and a machining object "workpiece 2," to which all control data pertaining to the illustrated workpiece 2 belong, are provided. The additional machining operations to be performed on workpiece 1, namely, the machining group and the individual machining operations in a group on workpiece 1 and the individual machining operations on the workpiece 2 are, respectively, assigned machining objects in the illustrated manner below the workpiece level.

Figure 5:
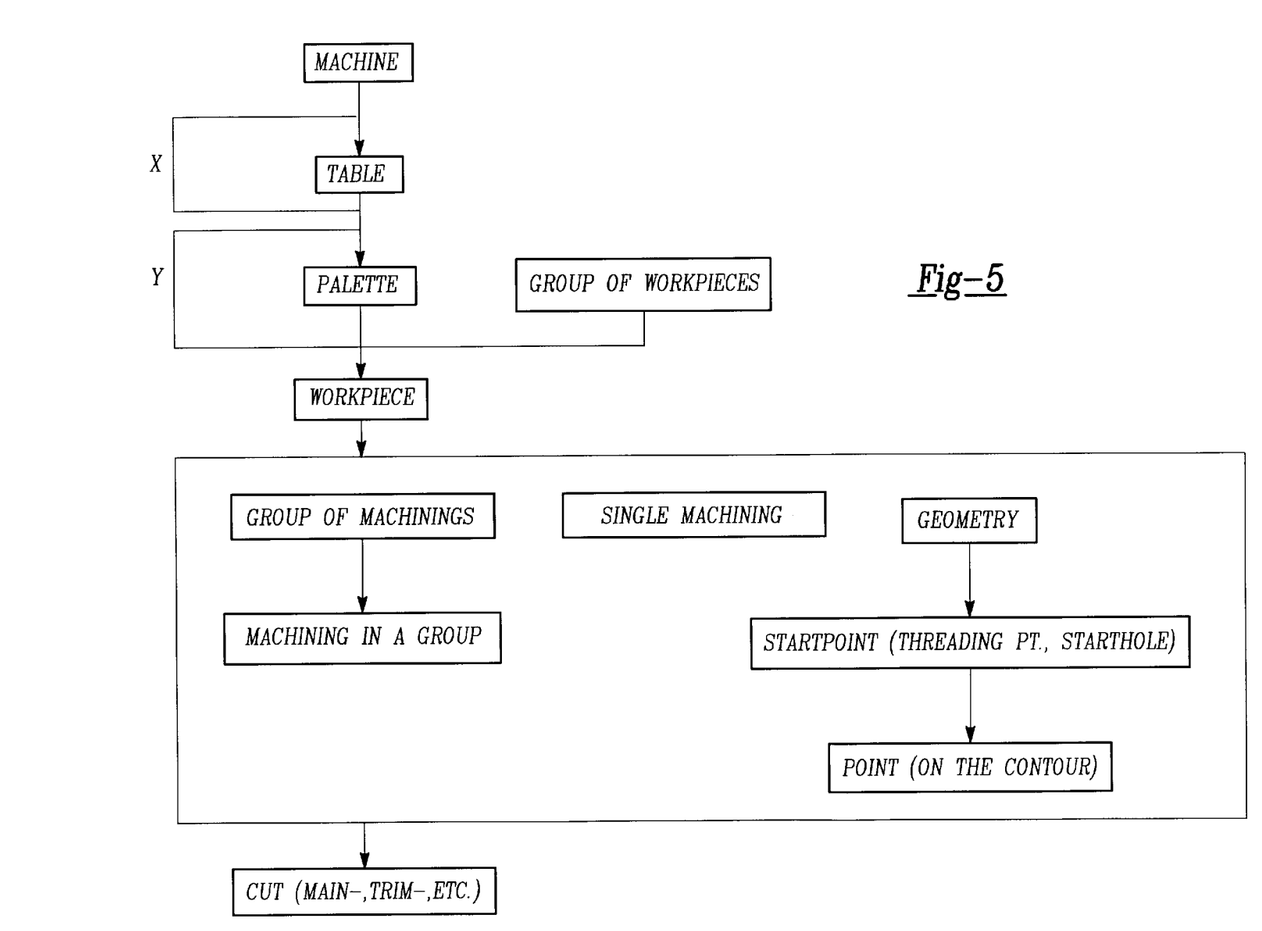
FIG. 5 shows a schematic illustration of hierarchically ordered object data for characterizing individual machining objects of the erosive cutting machine.

FIG. 5 shows an additional example of a hierarchical object structure of an erosive cutting machine. The associated object data is arranged linearly, i.e., in sequence in a memory, for instance, in memory 10 of FIG. 2, and are managed hierarchically in the sequence indicted by the arrows. The machine level here represents the highest level of the hierarchy. The hierarchically subordinated machining objects are in order: the workpiece table, a pallet, i.e., an arrangement for housing one or more workpieces, a group of workpieces (known as a lot) a special workpiece, a special machining operation as well as a special cutting path.

Depending on need and the complexity of the machining, individual objects can be "leapfrogged." This makes sense whenever the machining conditions on different object levels of the EDM machine are exactly the same and therefore any special procedures for the corresponding machining objects need not be differentiated. In FIG. 5 for example, the objects "workpiece table" and "pallet" can be leapfrogged in the manner indicated by the loops X and Y. Accordingly, no distinction is made between machining steps which pertain to the object "machine" and those which pertain to the objects "workpiece table" and "pallet," respectively, and the same applies to the assignment of the corresponding events and actions.

Furthermore, the machining level in FIG. 5 is subdivided into different machining objects, each of which pertains to a group of machining operations, a special machining operation, a special machining geometry, a starting point (threading point or starting hole) or a point on the cutting path. These machining objects are grouped according to need in a particular sequence with respect to one another. Such a flexible object structure makes sense in a number of complex individual machining operations. The grouped objects are in turn managed in a prescribed hierarchical order, which can be arranged as needed by the machine operator. Such an arrangement has already been made in FIG. 5, according to which the object "group of machining operations" is assigned to the object "machining in a group," as indicated by the arrow. The remaining objects on the machining level have not been activated.

We claim:

1. A method for controlling machine tools by a control device, wherein:

the control device (40) has available a list of event data (20) for characterizing prescribed operating states (events), in particular, malfunctions, and a list of action data for controlling special procedures (actions);

wherein the event and/or action data are respectively assigned to a machining object and/or operating mode of the machine tool, wherein the machining objects include at least the machine tool, a workpiece, and a machining operation, and wherein the operating modes include a machining mode, a simulation mode, and a set-up mode;

for a particular machining object and/or operating mode, the event data are selected and linked to action data such that upon occurrence of one or more events, one or more actions are performed in a prescribed sequence.

2. Method according to claim 1, characterized in that the machining objects of the machine tool are managed hierarchically by the control device (40) such that the action(s) belonging to one or more events of a hierarchically higher machining object also applies/apply to all machining objects situated below it.

3. Method according to claim 1 for controlling an erosive cutting machine, characterized in that the machining objects comprise the following elements:

the erosive cutting machine as such (2);

a workpiece table;

a pallet;

a group of workpieces;

a workpiece (4);

a machining operation (6.1, 6.2, 6.3); and a cutting path which are hierarchically subdivided and correspondingly managed.

4. Method according to claim 3, characterized in that the machining object—pertaining to a special machining operation—is further subdivided hierarchically into the elements:

several machining groups;

the machining in a special group;

an individual machining operation;

a special machining geometry;

a starting point; as well as a point on a path to be cut.

5. Method according to claim 3, characterized in that action data is provided for the following events: beginning and end of a work sequence; beginning and end of machining; interruption of machining; lack of a workpiece to be machined; disruption in starting; wire breakage; short circuit; collision of an electrode guide; error in threading a wire electrode and/or error in the ISO program code.

6. Method according to claim 1, characterized in that the lists of event, action and/or object data are open, arbitrarily supplementable, lists.

7. Method according to claim 1, characterized in that the control device makes available a selection of possible actions for each event from the event list (20).

8. Method according to claim 1, characterized in that by specifying a defined machining object and/or a defined operating mode of the machine tool, a preliminary selection is made in the event list and displayed on the display unit (50); and by selecting one or more events from the event list, a preliminary selection is made in the action list and displayed on the display unit (50).

9. Method according to claim 1, characterized in that additional individualizing features for characterizing individual operating parameters are assigned to the action and/or event data.

* * * * *

UNITED STATES PATENT AND TRADEMARK OFFICE
CERTIFICATE OF CORRECTION

PATENT NO. : 5,940,301
DATED : August 17, 1999
INVENTOR(S) : Matthias Damman et al.

It is certified that error appears in the above-indentified patent and that said Letters Patent is hereby corrected as shown below:

Column 3, line 4 - Replace "action" with --action(s)--.
Column 3, line 5 - Delete "(s)".

Signed and Sealed this

Twentieth Day of March, 2001

*Attest:*

NICHOLAS P. GODICI

*Attesting Officer*  *Acting Director of the United States Patent and Trademark Office*